United States Patent
Ellis

(10) Patent No.: US 8,602,696 B2
(45) Date of Patent: Dec. 10, 2013

(54) FORM TAP HAVING A PLURALITY OF LOBES

(76) Inventor: Harry Leroy Ellis, Georgetown (CA)

(*) Notice: Subject to any disclaimer, the term of this patent is extended or adjusted under 35 U.S.C. 154(b) by 1067 days.

(21) Appl. No.: 12/576,768

(22) Filed: Oct. 9, 2009

(65) Prior Publication Data

US 2011/0085867 A1     Apr. 14, 2011

(51) Int. Cl.
*B23G 7/02* (2006.01)
(52) U.S. Cl.
USPC .......................... 408/222; 470/204
(58) Field of Classification Search
CPC ............. B23G 7/00; B23G 7/02; B21J 13/02; B21H 3/08
USPC ................... 408/204, 215–220; 470/198, 204
See application file for complete search history.

(56) References Cited

U.S. PATENT DOCUMENTS

| | | | |
|---|---|---|---|
| 710,988 | A | 10/1902 | Muir |
| 3,121,340 | A | 2/1964 | Anthony |
| 3,237,485 | A | 3/1966 | Van Vleet |
| 3,561,171 | A | 2/1971 | Van Vleet et al. |
| 4,235,149 | A | 11/1980 | Veldman |
| 4,393,624 | A | 7/1983 | Kushigian |
| 4,408,418 | A | 10/1983 | Corrette |
| 4,548,000 | A | 10/1985 | Junker |
| 6,217,267 | B1 * | 4/2001 | Sugano et al. ................. 408/222 |
| 6,499,920 | B2 | 12/2002 | Sawabe |
| 6,514,148 | B2 * | 2/2003 | Glimpel et al. ............... 470/204 |
| 2010/0329806 | A1 * | 12/2010 | Ellis .............................. 408/222 |

FOREIGN PATENT DOCUMENTS

| | | | | |
|---|---|---|---|---|
| DE | 102004002559 A1 | * | 8/2005 | ............... B23G 7/00 |
| EP | 1106292 A1 | * | 6/2001 | ............... B23G 7/02 |
| JP | 07-276139 A | * | 10/1995 | ............... B23G 7/02 |

OTHER PUBLICATIONS

Balax. Thredfloer Forming Taps. http://www.balax.com/forming.html, Sep. 16, 2009.
Sutton Tools. Technical Information—Taps: Tap Measurement Simplified. http://www.google.com/url?sa=t&source=web&ct=res&cd=1&url=http%3A%2F%2Fwww.pnaust.com.au%2FAssets%2F1401%2F1%2FIPD05MeasurementThread_tap.pdf&ei=tW-yStO-HY2aMYqylOQL&usg=AFQjCNG-dJfyQYINbySkfd9N22utIBfgOw&sig2=IZxnYu7UG8EdUt2hlGzK5w. Sep. 17, 2009, pp. 163-170.

* cited by examiner

*Primary Examiner* — Daniel Howell
*Assistant Examiner* — Ryan Rufo
(74) *Attorney, Agent, or Firm* — Bereskin & Parr LLP

(57) ABSTRACT

A form tap for tapping an article may include a longitudinal shank having a mounting end opposite a tip, the shank having a shank length, and a thread portion with a plurality of threads for engaging a surface of the article. The thread portion includes a first region, a second region and a third region. The form tap includes a plurality of lobes extending though the first and second regions from the tip to the second region end, the lobes being spaced circumferentially around the shank and lying on a crest circumference. Each lobe may be disposed between respective first and second convex relief portions and each relief portion may be spaced radially inward from the crest circumference. Each lobe has a lobe width, the lobe width at the second region end being greater than the lobe width at the tip. The third region is free of lobes.

20 Claims, 11 Drawing Sheets

FORM TAP HAVING A PLURALITY OF LOBES

FIELD

The described examples relate to form taps, and particularly to form taps having a plurality of lobes.

BACKGROUND

The process of forming threads on the inner surfaces of holes is generally known as tapping. The tools used to form the threads are generally referred to as taps. Taps are generally classified into two categories "cut taps" and "form taps" based on the method used to produce the threads in the finished part being tapped.

A form tap creates threads on the inner surface of a hole by shaping and forming the material of the hole into the desired configuration. This process is also referred to as flowing the metal, cold forming, cold working or thread rolling. The leading tip of a form tap is narrowed or angled (chamfered) below the size (diameter) of the hole to be tapped, to allow the tap to be properly aligned with a hole, and to begin the forming process gradually when the form tap is used. The threads on the angled portion of a form tap are not ground or sheared into partial/truncated threads. Instead, the threads in the angled or chamfered portion of a form tap are generally formed as full threads having a crest and root configuration that is similar to the rest of the threads on the form tap. Traditional methods of manufacturing form taps tend to produce an error in the spacing, or pitch, of the threads between the crests of the threads of the finishing portion of the form tap and the crests of the threads of the angled or chamfered portion of the tap. This thread shaping error is generally known as lead error.

When a form tap has a lead error it may have a shorter lifespan and require increased torque to operate. One known attempt to correct lead error is the use of advanced CNC thread forming machines that allow for precise, computer control of the thread grinding process. However, form taps produced using CNC machines still tend to have a lead error between the crests of the threads on the finished form tap.

Some form taps have lobe portions around the circumference of the form tap that are separated by alternating relief portions. The lobe portions define "high points" or radial maxima of the threads at a given axial position, while the relief portions have a smaller radius than the lobe portions.

U.S. Pat. No. 4,235,149 (Veldman) describes a thread forming screw having a helical thread and a tapered lead-in section with a polygonal cross section. The screw is formed from a conventional blank by rolling the blank between a pair of thread rolling dies having means thereon to form alternating convex lobes and concave relief areas in the frusto-conical surface of the blank. Thus, the screw may be formed with a polygonally shaped threading end without a prior working of the blank's frusto-conical surface. Curved ramp surfaces smoothly interface the lobes and concavities to allow metal in a workpiece being threaded to roll into the concavities thereby reducing the torque needed to form a thread in the workpiece.

The screw described by Veldman is intended for one time use, and is designed to form threads while being screwed into an article and then remain attached to the article. To form the threads in the workpiece screw includes a plurality of lobes separated by concave relief areas and curved ramp surfaces for smoothing the transition between the lobes and the concavities. Because of its fastening function, all of the lobe and concavity features are limited to the tapered lead-in section of the screw and the fastener described by Veldman is preferably formed with a continuous helical thread having a constant inner and outer diameters from the first thread adjacent the leading end section to the last thread so that when the screw is fully threaded into the workpiece it provides a full thread grip because of the full engagement between the threads and the workpiece. Based on the teachings of Veldman, a skilled person may not consider extending the lobes and concavities beyond the tapered lead in section, past the first thread, because of the potential decrease in fastening strength.

Veldman also teaches that the majority of the region between adjacent lobes should comprise concave relief portions, that the need to have a preformed polygonal cross section on the tapered lead-in section is avoided and likewise a convex surface between the lobes is also avoided.

In contrast, form taps may be re-usable tools that are used to form threads in other articles hundreds or thousands of times before needing to be replaced.

SUMMARY

The following introduction is provided to introduce the reader to a more detailed discussion to follow. The introduction is not intended to limit or define the claims.

Examples disclosed herein provide a form tap having no lead error and a grinding tool for creating the form tap having no lead error. The form tap comprises a plurality of threads for creating formed threads inside a hole or article being tapped. Each thread on the form tap has a crest and a root. The threads on the form tap are separated into a finishing portion and chamfer portion. The form tap is described as having no lead error (or having a lead error correction) because the crest-to-crest spacing between threads on the form tap remains constant along both the finishing portion and the chamfer portion as well as across the transition between the finishing portion and the chamfer portion.

The form tap having no lead error is created using a unitary grinding tool that can be installed on a traditional grinding machine. The grinding tool comprises two spaced apart ribs that extend from its periphery surface. The ribs and the spacing between them are configured such that the threads on the chamfer portion and the finishing portion of the form tap can both be formed using the unitary grinding tool, and that the grinding tool can be used to shape both the chamfer portion and finishing portion threads on each continuous machine pass.

In a first aspect, some examples of the invention provide a form tap that includes a shank having a shank length and a thread portion that extends along at least a portion of the shank length. The thread portion includes a finishing portion and a chamfer portion. Each of the finishing portion and the chamfer portion include a plurality of threads and each thread has a crest and a root. The plurality of threads of both the finishing portion and the chamfer portion are spaced apart at a constant pitch, such that a crest-to-crest distance between adjacent threads remains constant along the entire thread portion.

According to another broad aspect, a grinding tool for forming threads on a form tap is provided which comprises a grinding wheel, first and second ribs and a trough therebetween. The grinding wheel has a peripheral surface and the first and second ribs project radially from the peripheral surface of the grinding wheel for grinding the threads. The first rib is sized and shaped to grind the roots of threads on a finishing portion of the form tap. The first rib comprises a first peak and defines a first outer diameter, a first minor diameter and a first rib width. The second rib is shaped to grind roots of threads on a chamfer portion of the form tap. The second rib comprises a second peak and defines a second outer diameter that is smaller than the first outer diameter, a second minor diameter and a second rib width that is smaller than the first rib width. The trough has a grinding surface for grinding crests of the threads on both the finishing and chamfer portions of the form tap. The first and second peaks are spaced apart by a peak spacing distance, the peak spacing distance being different than a pitch of the threads.

In some examples, the first rib further comprises a first rib leading face and a first rib trailing face; and the second rib further comprises a second rib leading face that is substantially parallel with the first rib leading face, and a second rib trailing face.

In some examples, the first rib further comprises a first peak radius and the second rib further comprises a second peak radius that is smaller than the first peak radius.

In some examples, the first and second ribs are formed on the grinding wheel.

In some examples, the first rib is formed on the grinding wheel and the second rib is formed on a second grinding wheel.

In some examples, the peak spacing distance is based on the pitch and a chamfer angle.

In some examples, the peak spacing distance is less than the pitch.

In some examples, the trough further comprises a grinding surface for forming crests on the threads.

In some examples, the rib spacing distance is between n and n+1 pitches, wherein n is integer greater than or equal to zero.

In some examples, the second peak forms a sharp edge.

According to another broad aspect, a method of forming the thread portion of a form tap using a unitary grinding tool is provided, the method comprises the step of providing a blank. The blank has a first longitudinal axis defining a first axis of rotation and an outer surface. The method also comprises the steps of rotating the blank about the first longitudinal axis and providing a grinding tool. The grinding tool defines a second axis of rotation and has a peripheral surface that comprises first and second ribs projecting radially therefrom. The method also comprises the steps of rotating the grinding tool about the second axis of rotation. The second axis of rotation being substantially parallel to and offset from the first axis of rotation. The method also comprises the steps of positioning the first and second axes of rotation at a first distance so that at least one of the first and second ribs interfere with the outer surface of a chamfer portion of the blank, imparting relative axial movement between the blank and the grinding tool at an axial feed rate and simultaneously increasing the distance between the first and second axes of rotation, thereby at least partially forming a plurality of threads on the chamfer portion. The threads have crests spaced at a constant crest-to-crest spacing. The method also comprises the step of maintaining the relative axial motion between the blank and the grinding tool at the axial feed rate while maintaining the second axis of rotation at a second distance from the first axis thereby at least partially forming a plurality of threads on a finishing portion of the form tap. The threads on the finishing portion are continuous with, and have a constant crest-to-crest spacing with the threads on the chamfer portion.

In some examples, the threads on the finishing portion and the threads on the chamfer portion are formed by a single pass of the grinding tool.

In some examples, the threads on the finishing portion and the threads on the chamfer portion are formed by the combination of at least two passes of the grinding tool.

In some examples, wherein the grinding tool partially forms the threads of both the chamfer portion and the finishing portion on each pass.

In some examples, the threads on the finishing portion are only partially formed by the second rib.

In some examples, the partially formed threads on the finishing portion are completed by the first rib.

According to another broad aspect a form tap for tapping an article may include a longitudinal shank having a mounting end opposite a tip. The shank has a shank length. The form tap may also include a thread portion comprising a plurality of threads for engaging a surface of the article, the thread portion extending longitudinally along the shank from the tip to a thread end. The thread portion may comprise a finishing section and a chamfer portion extending between the tip and a transition thread. The thread portion may include a first region extending from the tip to the transition thread, a second region extending from the transition thread to a second region end intermediate the transition thread and the thread end, and a third region extending from the second region end to the thread end. The form tap may also include a plurality of lobes extending though the first and second regions from the tip to the second region end, the lobes being spaced circumferentially around the shank and lying on a crest circumference. Each lobe may be disposed between respective first and second convex relief portions, each relief portion may be spaced radially inward from the crest circumference. Each lobe has a lobe width, the lobe width at the second region end being greater than the lobe width at the tip. The third region comprises a plurality of finishing threads and being free of lobes.

In some examples, the lobe width at the second region end is between 2 and 8 times greater than the lobe width at the tip.

In some examples, the lobe width remains generally constant from the tip to the transition thread.

In some examples, the lobe width at the second region end is between 2 and 8 times greater than the lobe width at the transition thread.

In some examples, the lobe width increases from the tip to the second region end in a non-linear manner.

In some examples, each thread in the first and second region comprises a crest radius, the crest radius of each thread being greater at the lobes than at the relief portion.

In some examples, each relief portion defines a relief width, the relief width at the second region end being less than the relief width at the tip.

In some examples, the relief width at the tip is between 2 and 25 times larger than the lobe width at the tip.

In some examples, the relief width at the tip is at least 2 times larger than the lobe width at the tip.

In some examples, adjacent ones of the threads in the thread portion are separated by a pitch and the second region end is within 10 pitches of the transition thread.

In some examples, the form tap further comprises a plurality of longitudinal lubrication grooves. Each lubrication groove may disposed in a respective one of the relief portions to enable lubricant to flow longitudinally.

In some examples, each lubrication groove has a constant groove width and a groove length that is parallel to a longitudinal axis of the shank.

In some examples, each lubrication groove is inclined at groove angle relative to the longitudinal axis.

In some examples, the groove angle is the same as a chamfer angle.

In some examples, each thread of the plurality of threads has a crest and a root separated by a thread height and each groove has a groove depth, the groove depth being greater than the thread height so that a bottom surface of each groove is disposed radially inward of the thread roots.

In some examples, wherein each thread of the plurality of threads comprises a crest and a root, the plurality of threads being spaced apart by a constant pitch such that a crest-to-crest distance between adjacent threads remains constant along the entire thread portion.

BRIEF DESCRIPTION OF THE DRAWINGS

For a better understanding of the form taps described herein and to show more clearly how they may be carried into effect, reference will now be made, by way of example only, to the accompanying drawings which show at least one exemplary embodiment, and in which.

DESCRIPTION OF EXEMPLARY EMBODIMENTS

Figure 1:
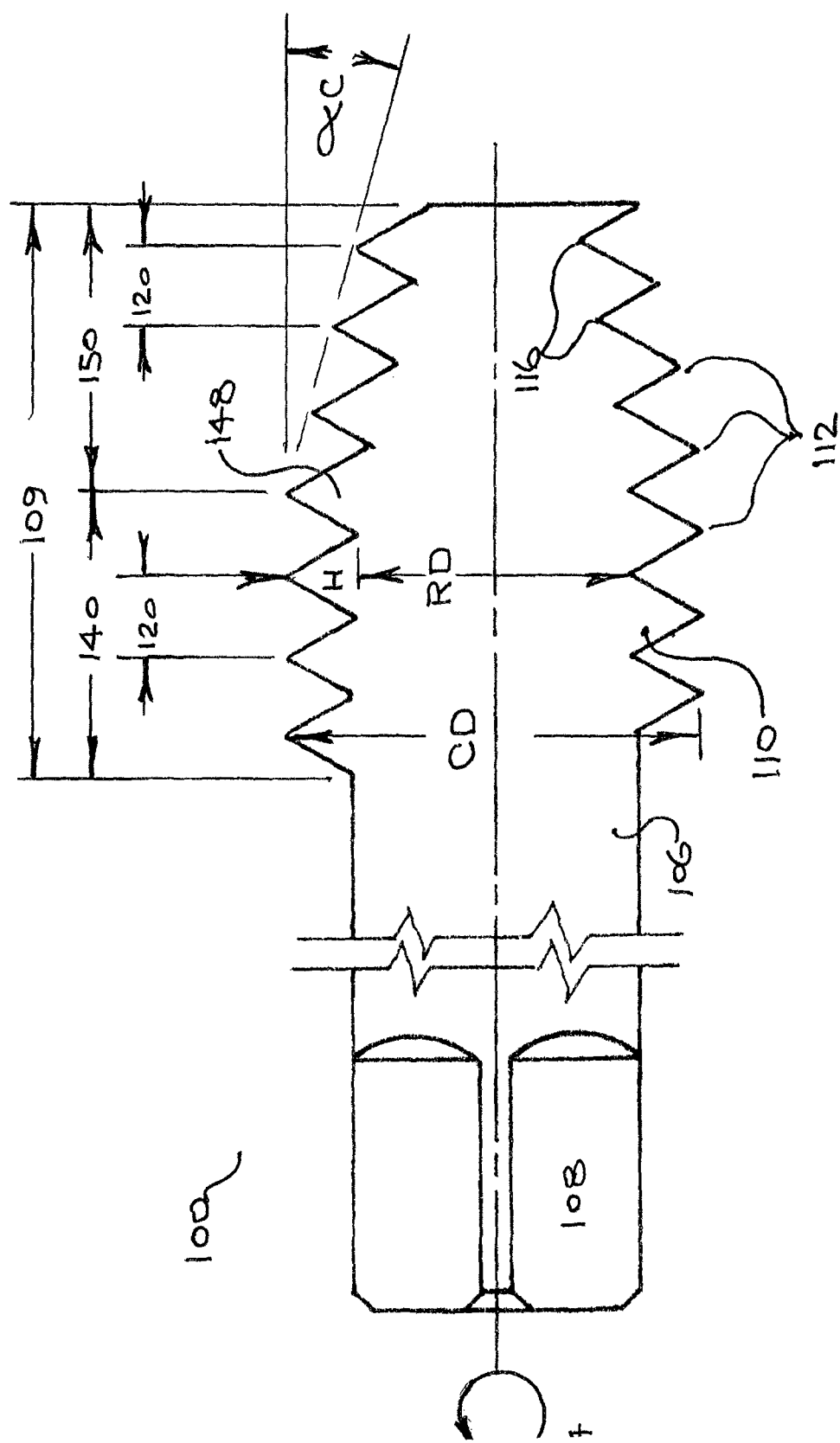
FIG. 1 is a section view of a form tap.
Figure 2:
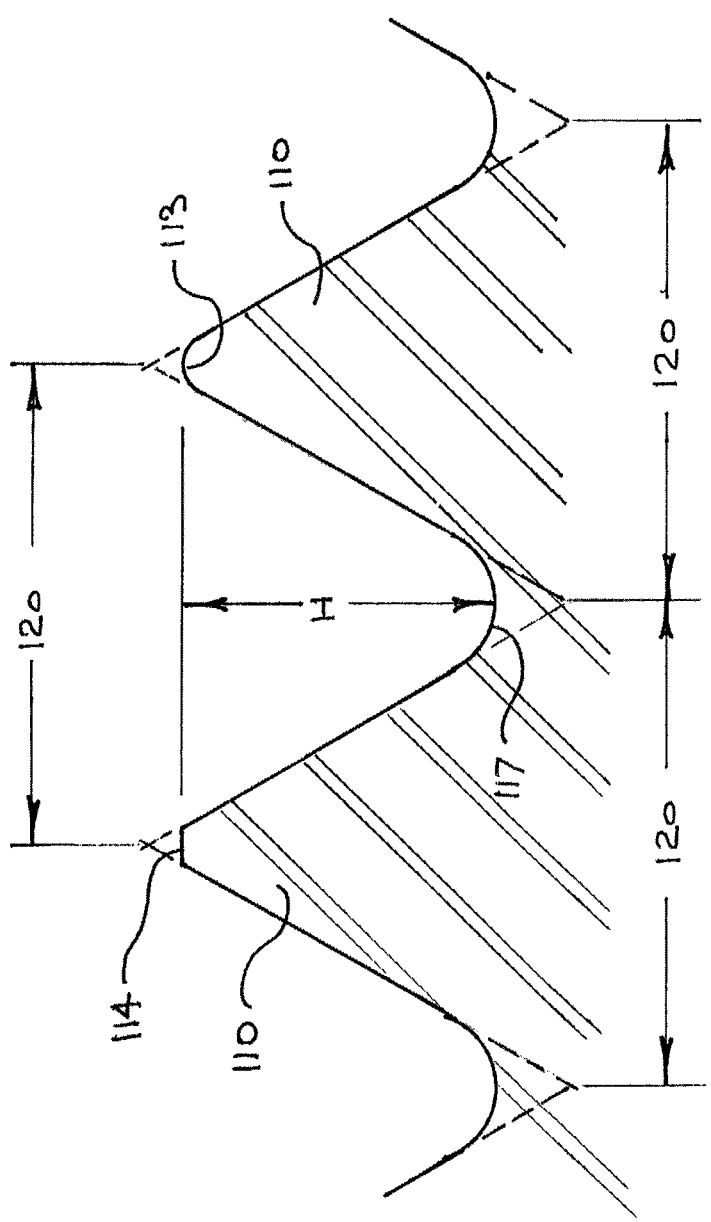
FIG. 2 is a partial section view of examples of threads for a form tap.

Reference is first made to FIGS. 1 and 2, which show an example of a form tap 100 having a shank 106 and a thread length or thread portion 109. The thread portion 109 includes a plurality of threads 110 and defines a finishing portion 140 and a chamfer portion 150 that are separated by a transition thread 148. For the purposes of this description, the form tap 100 is understood to include a plurality of threads 110, each thread 110 representing one revolution, or turn around the shank 106.

The term "thread" is also commonly used in the art to describe the single, continuous helical structure formed by the cooperation of each thread 110 as defined in this specification. In this context, each thread 110 may be understood as forming a portion or segment of the larger helical structure, but for the clarity, in this description the term "thread 110" is a single turn around the shank 106.

The term "threads" is also commonly used in the art to describe the features formed on the inner surface of a hole being tapped by the form tap 100. For clarity, in this description the term "formed threads" is used when referring to the "threads" created by the use of the form tap 100. In this description, the term "threads" is not limited to threads of a specific size, shape or configuration, but includes any thread forms and tap dimensions.

Each thread 110 of the form tap 100 has a crest 112 and a root 116. In this description a distance measured from a first crest to an adjacent crest or from a first root to an adjacent root is called a pitch 120. The pitch 120 may also be understood and described as a lead or thread spacing. The distance between opposing crests 112 on the form tap 100 is referred to as the crest diameter CD (or major diameter or outer diameter), and the distance between opposing roots 116 is referred to as the root diameter RD (or minor diameter or inner diameter). The difference between the crest diameter CD and the root diameter RD defines a thread height H.

As exemplified in FIG. 1, in some examples of a form tap 100 the chamfer portion 150 of the form tap 100 tapers at a chamfer angle $\alpha_c$ toward the tip (or end) of the form tap 100, to the right as shown in FIG. 1. Within the chamfer portion 150, the crest diameter CD and the root diameter RD both decrease as the chamfer portion 150 tapers, but the relative distance between the crest diameter CD and the root diameter RD (i.e. the thread height H) remains generally constant. At the tip of the form tap 100, shown at the right of FIG. 1, the crest diameter CD is smaller than the crest diameter CD of the finishing portion 140. In use, the tip of the chamfer portion 150 is inserted into the hole to be tapped, and the relatively smaller crest diameter CD may enable a user to easily insert and align the form tap 100 within the hole. The threads 110 of the chamfer portion 150 also serve to partially form the formed threads in the hole being tapped. As the form tap 100 is advanced into the hole being tapped, the threads 110 of finishing portion 140 complete, or finish, the formed threads that had been partially formed by the chamfer portion 150 by forming them into their final, usable or finished configuration. Optionally, the surface of the form tap 100 may comprise a plurality of lobes spaced around the surface of the form tap containing the threads 110, separated by lubrication grooves that do not contain threads. It is understood that the number, shape and configuration of the lobes formed on the form tap 100 may be selected based on the expected amount of heat and pressure exerted on the form tap during the form tapping process.

In existing form taps, it is common for the pitch or lead between adjacent thread crests to change, or be distorted, at the transition point (for example transition thread 148) between the finishing portion and the chamfer portion of the form tap. That is, in known form taps, the crest-to-crest distance between the transition thread and the first adjacent thread in the chamfer portion of the form tap is different than the desired pitch or lead. This change in the pitch or lead is generally referred to as lead error. In other words, in previously known form tap designs, the pitch (or lead or thread spacing), at the transition from finishing portion to chamfer portion is different than the pitch within the finishing portion and/or the chamfer portion. This type of lead error can result in increased form tap wear, increased torque requirements when using the form tap and irregular or improper formed threads in the article being tapped. Lead error may also increase the amount of heat and pressure exerted on the threads of a form tap during the form tapping process. Reducing or correcting the lead error may allow the lobes of a form tap to be larger which may extend the useful life of the form tap, as the heat and pressure acting on the form tap threads is reduced.

The effects of lead error described above are generally associated with a form tap having the lead error between the crests of its threads, as opposed to the roots of its threads. The effects of a lead error across the root-to-root distance of the transition thread (for example transition thread 148) may be less of a problem when the form tap is in use because the roots of the threads on the chamfer portion (for example chamfer portion 150) of a form tap do not engage or contact the formed threads in the hole being tapped. When a form tap is selected to tap a hole in an article, the characteristics of the form tap may be selected based on the desired final characteristics of the formed threads in the hole being tapped. For example, if the hole being tapped requires finished threads with a thread height of 2 mm, then the thread height H (i.e. the distance between the CD and the RD) along the finishing portion of the form tap may be set at 2.2 mm.

When the form tap is first inserted into the hole to be tapped, the crests of the chamfer portion may engage a portion of the hole wall because the crest diameter CD of the threads in the chamfer portion may be greater than the root diameter RD of the finishing portion. As the form tap is advanced into the hole, each thread in the chamfer portion may engage progressively more material in the hole wall, due to the increasing crest diameter along the length of chamfer portion. However, because the root diameter(s) RD along the chamfer portion are less than the root diameter RD of the finishing portion, the roots 116 of the threads 110 in the chamfer portion 150 do not contact the formed threads (i.e. the material of the hole wall) during the tapping process. Because the roots 116 do not contact the formed threads, the shape and configuration of the roots 116 of the chamfer portion 150 do not affect the formed threads in the article being tapped. Accordingly, errors in the spacing between the roots 116 of the chamfer portion 150 and the roots 116 of the finishing portion 140 may not create the lead error problems described above.

Therefore, it is understood that a form tap that is described as having "no lead error" or a "lead error correction" is a form tap having a constant crest-to-crest pitch (or lead), but that the form tap may have a lead error between the roots 116 of the chamfer section 150 and the roots 116 of the finishing portion 140. A lead error between roots 116 may not cause the lead error problems described above.

The form tap 100 described in this specification has no lead error between thread crests; i.e. the thread pitch 120 or lead of the form tap 100 remains constant along the entire thread portion 109. The form tap 100 is formed using a grinding tool that produces threads 110 that have a lead error correction or that are considered lead error free, as defined above. The crest-to-crest spacing between adjacent threads 110 of the form tap 100 remains constant along the length of the finishing portion 140, across the transition thread 148 and along the length of the chamfer portion 150. In this description, the term "constant" is understood to mean that the pitch 120 of the threads 110 remains essentially equal between adjoining threads for useful or practical purposes, subject to the manufacturing dimensional tolerances known in the art, and should not be strictly interpreted as meaning exactly identical.

Each thread 110 on the form tap 100 can be formed into a variety of known configurations based on the user's requirements. Examples of some possible thread 110 configurations are shown in FIG. 2. In one example, a thread 110 may be shaped so that the crest 112 comprises a crest flat 114, as shown on the left of FIG. 2. Or, as shown on the right of FIG. 2, a thread 110 may be shaped so that the crest 112 comprises a crest radius 113. In a preferred embodiment, the threads 110 are shaped so as to have a crest radius 113 as the crest radius 113 may help flow the material of the article being tapped, which may reduce the force required to tap the material and may prolong the useful life of the form tap 100. The shape of the crest 112 on the form tap 100 determines the shape of the major diameter created in the formed threads of the article being tapped.

It is understood that the specific details of the thread 110 features, for example the size of the crest flat 114 or crest radius 113, may be set by the form tap 110 manufacturer or they may be based on customer or user requirements. While the configuration of the thread 110 features may vary between form taps 100, the pitch 120 of the threads 110 on a given form tap 100 remains constant regardless of the thread configuration.

The form tap 100 also defines a first axis of rotation 104 that extends in the longitudinal direction of the form tap 100. In use, the form tap 100 is rotated about the first axis of rotation 104 to create the formed threads in an article that is being tapped. The form tap 100 may also be rotated about the first axis of rotation 104 during the form tap 100 manufacturing process described in detail below.

In most examples of the form tap 100, the shank 106 is generally round or cylindrical with flattened mounting portions (square driver) 108 to enable the form tap 100 to be securely mounted and gripped within a chuck, handle or other tool holding device. The shank 106 may contain any desired number of mounting portions 108 as needed to fit into a particular grinding machine (during manufacture) or a particular tool holder or handle (during use). Optionally, the shank 106 may be of a non-circular cross section, for example hexagonal, octagonal or any other suitable shape. In such a configuration, the shank 106 may not comprise discrete mounting portions 108 because the surfaces of the shank 106 itself may provide adequate mounting surfaces.

In the examples shown, the chamfer portion 150 has been shown having 3 threads 110, however; it is understood that the chamfer portion 150 may have a greater or fewer number of threads 110 (and optionally a longer or shorter length). In the figures, the size of the chamfer portion 150 relative to the finishing portion 140 may be exaggerated for clarity, but it is understood that the finishing portion 140 may be substantially larger than the chamfer portion 150 in some form taps 100. Also, it is understood that if the number of threads 110 in the chamfer portion 150 is changed, the chamfer angle $\alpha_c$ may also change.

While the form tap 100 is shown having continuous threads 110, it is understood that the threads 110 of the form tap 100 may be separated into a plurality of lobes. Also, portions of the form tap 100 may be treated using any known treatment process to produce desired mechanical properties. For example, the form tap 100 may be heat-treated, surface hardened, plated or coated with any desired coating such as chrome plating, TiN (Titanium nitride), TiCN (Titanium carbonitride) and layered TiAlN (Titanium aluminum nitride).

Figure 3:
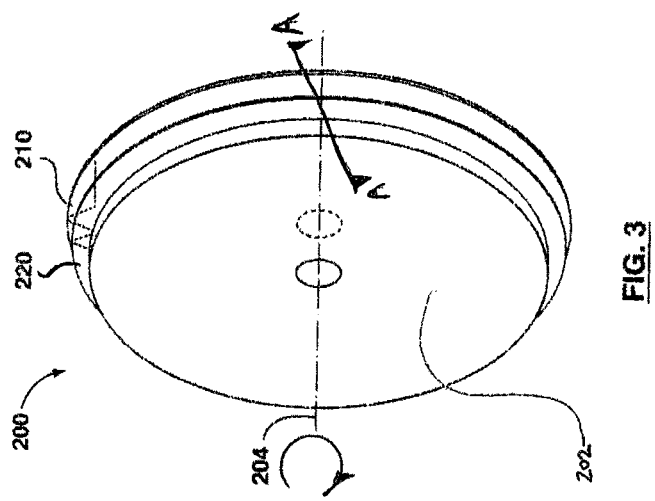
FIG. 3 is an isometric view of a grinding tool.

To create the form tap 100 having no lead error (i.e. a constant crest-to-crest pitch or lead along the entire thread portion 109) an operator may grind the form tap 100 using a unique grinding tool. FIG. 3 shows an example of a grinding tool that may be used to create the form tap 100 having no lead error, as described above. The grinding tool 200 can create form taps 100 having a lead error correction or a lead error adjustment that eliminates the lead error in the completed form tap, for all practical purposes, as described above. The grinding tool 200 is capable of creating constant crest-to-crest thread leads or pitches because its design ensures that any lead error introduced into the threads 110 is located on the roots 116 of the chamfer portion 150 which, as described in detail above, have no practical effects on the performance of a form tap or the shape of the formed threads.

FIG. 3 shows one example of a grinding tool that can produce a form tap having no lead error. As shown, grinding tool 200 (for example a grinding wheel 202) includes a first and second ribs 210 and 220 extending radially from its peripheral surface. The grinding tool 200 also defines a second axis of rotation 204. In use, the grinding tool 200 is mounted on a suitable thread grinding machine, such as thread grinding machines manufactured by Jones & Lamson, Matrix, Drake or Normac (not shown). The first and second ribs 210, 220 engage the form tap 100 to form the threads 110. Details relating to the configuration of the first rib 210 and second rib 220 are explained below with reference to FIGS. 4 and 5.

Figure 4:
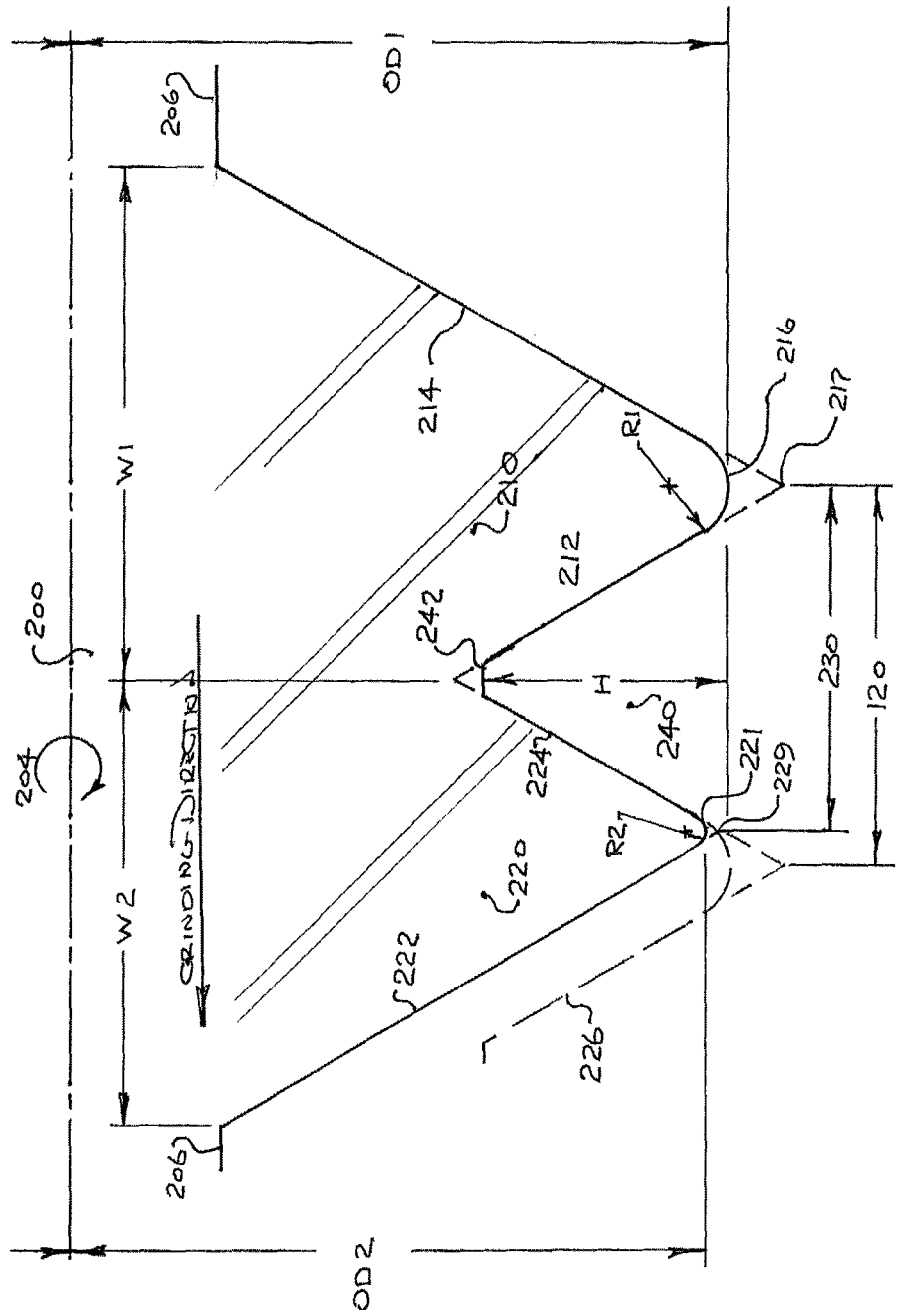
FIG. 4 is a partial section view of the grinding tool of FIG. 3.

FIG. 4 is a partial sectional view of the grinding tool 200 taken at section A-A showing the first rib 210 and the second rib 220 separated by a trough 240. As shown, the first rib 210 comprises a first rib leading face 212 and a first rib trailing face 214 that meet to define a first rib peak 216. The first rib 210 may also be described as the larger rib, the trailing rib or the finishing-grinding rib.

In some examples, the first rib leading face 212 and the first rib trailing face 214 may intersect to form a sharp edge at a theoretical first rib peak 217, illustrated using dashed lines in FIG. 4. However, the first rib 210 preferably comprises a peak 216 having a first peak radius $r_1$, instead of a sharp edge. Optionally, the first peak radius $r_1$ may be made as large as possible without creating an unsuitable shape of the root radius 117 (or threads 110 formed by the first rib 210) because increasing the first peak radius $r_1$ may decrease wear on the first rib 210 and extend the life of the grinding tool 200.

The first rib 210 also defines i) a first outer diameter OD1, which is the distance between the second axis of rotation 204 and the first rib peak 216, and ii) a minor or clearance diameter MD, which is the distance between the second axis of rotation 204 and the grinding tool shoulder 206. The difference between the first outer diameter OD1 and the minor diameter MD is at least equal to the thread height H doubled.

The grinding tool 200 also comprises a second rib 220. The second rib 220 may also be described as the smaller rib, the leading rib or the chamfer-grinding rib. The design, size and shape of the second rib 220 are related to, but are not equal to the dimensions of the first rib 210. To help illustrate this relation between the first and second ribs 210, 220 a phantom second rib 226 is shown using dashed lines in FIG. 4 The phantom second rib 226 represents a second rib that is identical to the first rib 210 and is spaced apart from the first rib 210 by a thread pitch 120. The phantom second rib 226 is only included for illustrative purposes and to help clarify the relation between the first rib 210 and the second rib 220.

As shown in FIG. 4, the second rib 220 defines a second rib leading face 222 and a second rib trailing face 224 that intersect to define a second rib peak 221. As described above in relation to the first rib peak 216, the second rib peak 221 may intersect to form a sharp edge 229 or it may comprise a second peak radius $r_2$, as shown in FIG. 4. The second rib leading face 222 is parallel to, but offset from the first rib leading face 212 while the second rib trailing face 224 coincides with the face of the phantom second rib 226 as shown.

The second rib 220 also defines a second outer diameter OD2, that is the distance between the second axis of rotation 204 and the second rib peak 221. As shown, the second outer diameter OD2 is less than the first outer diameter OD1. That is, the first rib 210 extends further from the grinding tool shoulder 206 than the second rib 220. Each rib 210, 220 also defines a rib width $W_1$, $W_2$ respectively. The first rib width $W_1$ is greater than the second rib width $W_2$.

Figure 5:
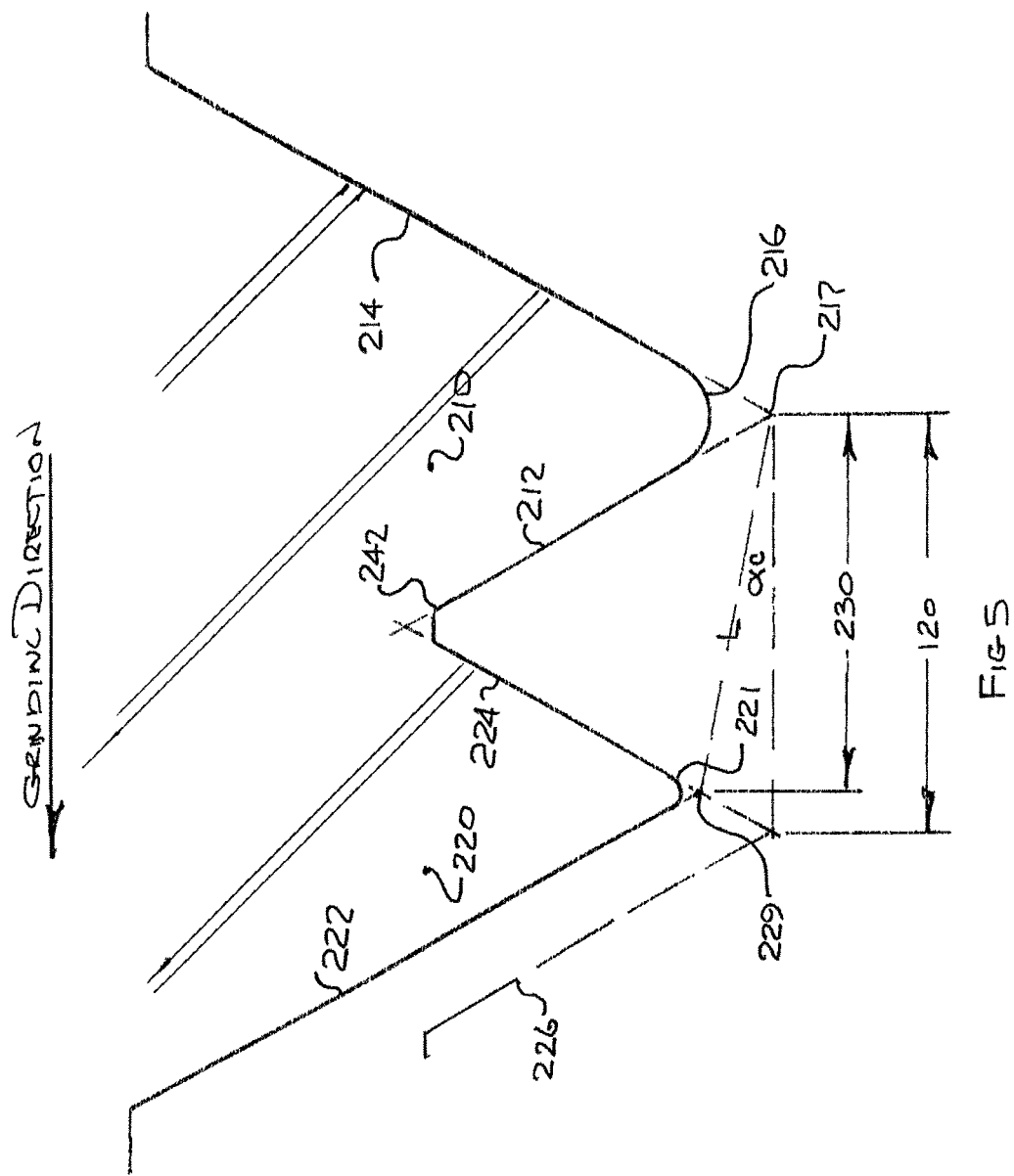
FIG. 5 is a schematic view of the partial section view of FIG. 4.

As exemplified in FIGS. 4 and 5 the second peak radius $r_2$ is smaller than the first peak radius $r_1$. Optionally, the second peak radius $r_2$ may be made as small as possible. In some examples, the second peak 221 may be initially formed as a sharp edge which then wears to form a second peak radius $r_2$ over time during use. Based on the performance of the grinding tool 200 and the required tolerances of the threads 110 formed using the grinding tool 200, there may be a range of second peak 221 profiles and second peak radius $r_2$ sizes that are acceptable. In such situations, a grinding tool 200 having a second peak radius $r_2$ that is as small as possible (or begins as a sharp edge) may allow that grinding tool 200 to be used for a longer period before the second peak radius $r_2$ exceeds a pre-determined maximum size and the grinding tool 200 has to be refurbished or dressed.

The trough 240 is defined by the depression or valley contained between the first and second ribs 210, 220. The trough 240 includes the leading edge 212 of the first rib 210, the trailing edge 224 of the second rib 220 and the tap OD grinding surface 242 at the bottom, or base of the trough 240. The height of the trough 240 relative to the first rib 210 (i.e. the distance between the grinding surface 242 and the first rib peak 217) is equal to the thread height H of the threads 110 on the finishing portion of the form tap 100. Accordingly, when the grinding tool 200 is in use, the grinding surface 242 is in contact with and shapes the crests 112 of the threads 110 of the finished form tap 100. As exemplified in FIGS. 4 and 5, the grinding surface 242 may be generally planar in order to form a crest flat 114 on each thread 110, but it is understood that in other examples of the grinding tool 200 the grinding surface 242 may comprise an arcuate shape having a radius to form a desired crest radius 113 on each thread 110 of the form tap 100. The distance between the second rib peak 221 and the grinding surface may be referred to as a second rib height and the distance between the first rib peak 216 and the grinding surface may be referred to as a first rib height.

The first and second ribs 210, 220 are separated by a peak spacing distance 230 that is measured from the centre of the first rib 210 to the centre of the second rib 220. The spacing between the first and second ribs 210, 220 is based on the desired thread pitch 120 of the threads 110 on the completed form tap 100 that is to be manufactured using the grinding tool 200. The peak spacing distance 230 is not equal to the thread pitch 120 or an even multiple thereof.

Optionally, the grinding tool 200 may be constructed so that the first rib 210 and second rib 220 are spaced to engage adjacent threads 110 on the form tap 100. In such a configuration the peak spacing distance 230 is less than the pitch 120.

FIG. 5 is a schematic representation of the sectional view of FIG. 4 showing the geometric relationship between the first rib 210 and the second rib 220 that determines the location of the second rib 220. For the purposes of calculating the geometric relationship between the first and second ribs 210, 220, measurements and calculations may be based on the locations of the theoretical first and second rib peaks 217, 229. The theoretical first and second rib peaks 217, 229 represent the location of the first and second ribs if both ribs were formed as sharp edges.

As shown in FIG. 5, the location of the second rib 220 relative to the first rib 210 is (for example the straight-line length L) is based on the desired pitch 120 and chamfer angle $\alpha_c$ of the form tap 100 calculated to give the required peak spacing distance to provide the lead error correction.

Because the configuration of the first and second ribs 210, 220 and the grinding surface 242 may be based on a desired combination of thread profile, pitch 120, root design length L and chamfer angle $\alpha_c$, a particular grinding tool 200 may be useful for creating a particular combination of these characteristics. For example, a grinding tool 200 configured to create a form tap having pitch 1.5 mm and a chamfer angle of 5 degrees may not be suitable for creating a form tap having a pitch 1.5 and a chamfer angle of 10 degrees. In some instances, a separate grinding tool 200 may be created for each desired form tap configuration/combination. However, in each example of the grinding tool 200 used, the resulting form tap 100 will have a constant crest-to-crest spacing as a result of the lead error correction/lead error adjustment described above.

The grinding tool 200 may be formed from a suitable material known in the art, including vitrified, ceramic and borazon. Also, the profile of the grinding tool 200 (i.e. the shape of the first and second ribs 210, 220) may be created using any known process including CNC dressing, roll dressing and crush forming. Preferably, the grinding tool 200 may be formed and shaped using a diamond dressing roll.

In the examples described, the grinding tool 200 has been shown as being a single tool, for example single grinding wheel having integrally formed first and second ribs, however; it is understood that the first and second ribs may not be integrally formed with the grinding tool 200. For example, the first and second ribs could be formed on a separate band, ring or collar that is connected around the periphery of a grinding wheel or other, non-consumable grinding tool body. Optionally, the first and second ribs may be formed on separate bands or rings, each of which is secured around the perimeter or periphery of the grinding tool 200. In yet another example, the grinding tool may comprise two separate grinding wheels spaced apart at an appropriate axial distance from each other along the second axis of rotation; each wheel comprising one of the ribs.

To manufacture the form tap 100 having no lead error (i.e. having a constant crest-to-crest spacing) using the grinding tool 200 as described above, an operator may install the grinding tool 200 on a grinding machine (not shown) so that it rotates about its second axis of rotation 204. A form tap blank (which will be formed into form tap 100) is then positioned in the thread-grinding machine. It is understood that the blank is loaded and secured in the machine in a known manner so that the blank rotates about the first axis of rotation 104. The first axis of rotation 104 is parallel to, and offset from the second axis of rotation 204. Once both the blank and grinding tool 200 have been mounted in the thread-grinding machine they are rotated about their respective axes of rotation.

Figure 6:
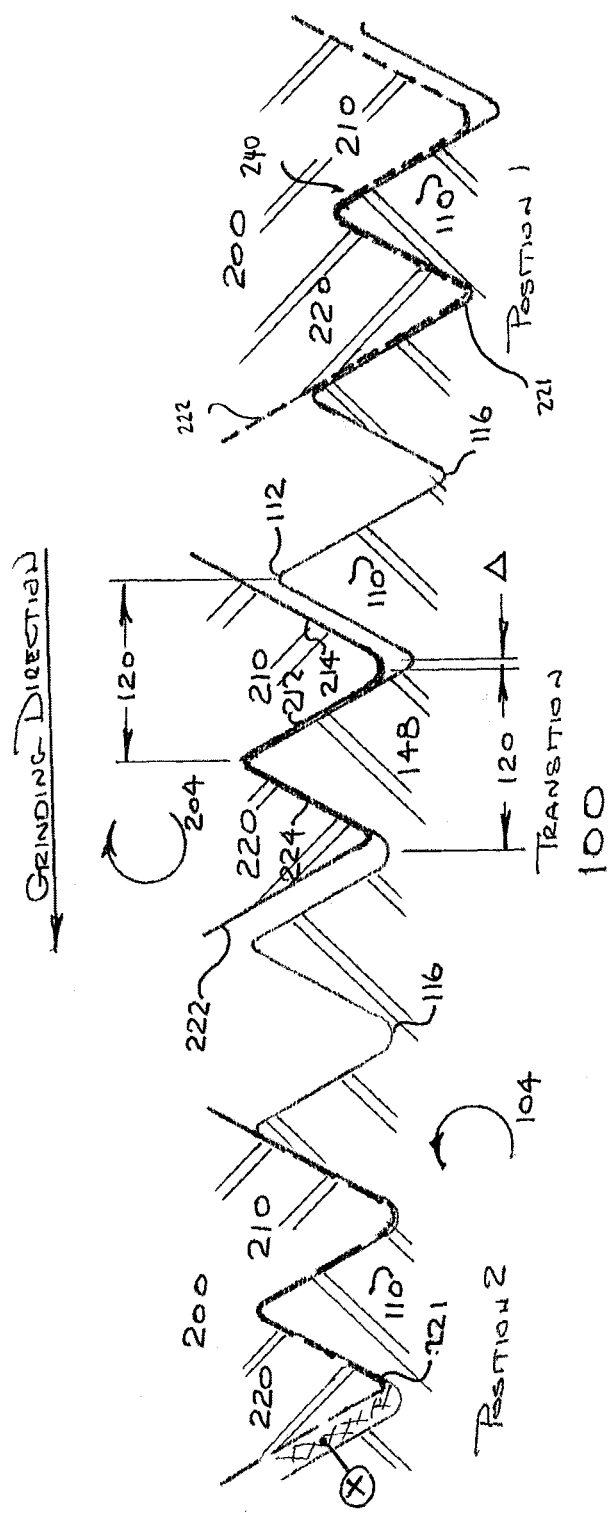
FIG. 6 is a schematic representation of a grinding tool forming threads on the chamfer, the transition thread, and the straight thread portions of a form tap.

With both the blank and the grinding tool 200 rotating, the second axis of rotation 204 is moved toward the first axis of rotation 104 so that the ribs 210, 220 of the grinding tool 200 engage (or interfere with) the surface of the blank of the form tap 100. FIG. 6 is a partial section representation of the grinding tool 200 ribs 210, 220 engaging the form tap 100. As both the form tap 100 and grinding tool 200 are rotated about their respective axes of rotation, the grinding tool 200 is advanced along the length of the form tap 100 (from the chamfer portion 150 to the finishing portion 140) at an axial feed rate, in generally the machine direction as shown in FIGS. 4-6.

In this application, the terms "machine direction" and "grinding direction" describe the relative motion between the grinding tool 200 and the form tap 100. It is understood that the necessary relative motion may be achieved by holding the form tap 100 in place and moving the grinding tool 200 from right to left as shown in FIG. 6, by holding the grinding tool 200 in place and moving the form tap 100 from left to right as shown in FIG. 6, or by a combination thereof. It is also understood that the machine direction is intended to describe the general direction of movement between the grinding tool 200 and the form tap 100 and that when the grinding tool 200 is forming the chamfer portion 150 of the form tap 100 the grinding tool 200 may move at an angle relative to the first axis of rotation 104. Preferably, the angle is the chamfer angle of the form tap being manufactured.

As exemplified in FIG. 6, when the grinding tool 200 is used to create a form tap 100, the different portions of the grinding tool 200, i.e. the first and second ribs 210, 220 and the trough 240 may perform different grinding or forming functions. Specifically, the second rib 220 and trough 240 perform a majority of the shaping and grinding on the chamfer portion 150 of the form tap 100, (shown as position 1) whereas the trough 240 and the first rib 210 cooperate to shape the threads 110 on the finishing portion 140 of the form tap 100 (shown as position 2). The operation of the grinding tool 200 in use is explained in further detail below.

When grinding tool 200 is used to form the chamfer portion 150 (position 1) of the form tap 100, the initial grinding of each thread 110 in the chamfer portion 150 is performed by the leading face 222, the second rib 220 and the second rib peak 221. For example, when the grinding tool 200 first contacts the form tap 100, the leading face 222 of the second rib 220 grinds and forms a corresponding face on a first thread 110 and the second rib peak 221 grinds the root 116 of the first thread 110. As the grinding tool 200 is advanced along the length of the form tap 100 (from right to left in FIG. 6 as shown using different line types to represent different positions of the grinding tool 200), the leading face 222 of the second rib 220 engages the next, adjacent thread (i.e. a second thread) on the chamfer portion 150 and simultaneously the trough 240 will engage and shape both faces and the crest and first thread. As shown, when the trough 240 is positioned about a thread 110, the second rib trailing face 224, the grinding surface 242 and the first rib leading face 212 cooperate to grind both faces and the crest 112 of the thread. When the trough 240 is engaged with a given thread, the leading edge 212 and second rib peak 221 of the second rib 220 may engage the next, adjacent thread.

To form the chamfer portion 150, the grinding tool 200 is advance along the length of the chamfer portion 150 at an angle relative to the first axis of rotation 104, preferably the chamfer angle. As a result of this angular displacement away from the first axis of rotation 104, as the grinding tool 200 advances the first rib peak 216 does not contact the roots 116 of the threads 110 in the chamfer portion 150 that were formed by the second rib 220. Therefore, as shown in FIG. 6 the roots 116 of the threads 110 in the chamfer portion 150 of the form tap 100 are shaped by the second rib peak 221 and have a root radius that is substantially equal to the second peak radius $r_2$. As described above, the shape of the roots 116 in the chamfer portion 150 is not critical because the chamfer roots 116 do not form part of the functional or useful portion of the form tap 100 (i.e. the thread crests 112 and the roots 116 of the finishing portion 140). The shapes of these roots 116 are not adjusted or modified by the first rib 210.

When the grinding tool 200 reaches the transition thread 148 the motion of the grinding tool 200 relative to the form tap 100 changes such that distance between the first axis of rotation 104 and the second axis of rotation 204 remains constant whereby the grinding tool 200 moves along the form tap 100 but does not move further away from the first axis of rotation 104. As a result of this change in relative movement, when the grinding tool moves along the finishing portion 140 of the form tap, the first rib 210 will follow the same path as the second rib 220. This may be advantageous because it enables the first rib 210 to complete threads 110 along the finishing portion 140 that have been partially formed by the second rib 220.

Specifically, as has been described above in detail, the first rib 210 is shaped to correspond to the desired finished thread 110 profile and the second rib 220 is narrower and shorter than the first rib 210 and has a second peak radius 221 that is smaller than the desired root radius of the finished form tap thread 110. Therefore when the second rib 220 grinds a thread 110 on the finished portion 140 an amount of residual material "X" (shown as the hatched region on the left side of FIG. 6) is left behind between the leading face 222 of the second rib 220 and the desired finished thread shape, shown in dashed lines.

During a subsequent revolution, as the grinding tool 200 is advanced along the flat, finishing portion 140, the first rib 210 will correct the finished thread shape by removing the residual material "X" and correcting the root radius using the leading face of the first rib 212 and the first rib peak 216 respectively. A schematic illustration of the position of the grinding tool's 200 movement from a first position (Short dashed lines) to a second position (long dashed lines) is shown in FIG. 6.

The grinding tool 200 is also shown in a third position or transition position (solid lines) in which the trough 240 is shaping the transition thread 148 and the leading face 222 of the second rib 220 would be partially forming the adjacent thread 110a. When the grinding tool 200 advances toward the second position (shown in long dashed lines) the leading face of the first rib 210 corrects and completes the shape of thread 110a by removing the residual material and shaping root 116a.

As shown, throughout the grinding process the crests 112 are shaped by the grinding surface of the trough 240. As the grinding tool 200 moves along the form tap 100, the trough is always "in lead" or on pitch which allows the crests 112 along the entire length of the form tap 100 to be free from lead error. In contrast, when the grinding tool 200 transitions from the chamfer portion 150, in which all the roots 116 are shaped by the second rib peak 221, to the finishing portion 140, in which the roots 116 are corrected by the first rib peak 216, a lead error Δ is created between the roots of the chamfer portion 150 and the roots of the finishing portion 140 due to the spacing between the first and second ribs 210, 220. However, as described above, because the roots of the chamfer portion do not form part of the functional portion the lead error Δ may not affect the performance of the finished form tap 100. This preservation of the crest-to-crest spacing at the expense of the root-to-root spacing enables the form tap 100 to have no lead error (as defined above) and may be an advantage of the grinding tool 200.

In the example shown (in FIG. 1), the form tap 100 includes three (3) threads 110 in the chamfer portion 150; however, it is understood that the chamfer portion 150 of a form tap may include a greater or fewer number of threads 110 in the chamfer portion 150, based on the user requirements, including pitch, thread height, and desired chamfer portion length.

In some examples, it may be possible for both the finishing portion 140 and the chamfer portion 150 of the form tap 100 to be formed using the grinding tool 200 in a single-pass process. That is, a blank is shaped into a form tap 100 by forming the threads 110 of both the finishing portion 140 and the chamfer portion 150 in a single, continuous operation by advancing the grinding tool 200 along the length of the blank, from the chamfer portion 150 to the finishing portion 140.

In other examples, the grinding tool 200 may be used to form the threads of a form tap in a multi-stage or multi-pass process. In such an example, during each successive pass the grinding tool 200 may remove progressively more material from the form tap blank. During each pass the grinding tool 200 may be moved along the entire length of a form tap blank, from chamfer portion 150 to finishing portion 140, to rough-in (or partially form) the threads of the form tap 100. Then, once the first pass has been completed, the grinding tool 200 may be repositioned closer to the first axis of rotation 104 of the form tap (generally in advance of the transition thread) and advanced along the length of the form tap for a second, rough-in pass. During the second pass, the ribs of the grinding tool may follow and further shape the partially-formed threads from the first rough-in pass. Generally, the final pass of a multi-pass process is referred to as the finishing pass in which the threads 110 are formed into their final shape. An advantage of the present grinding tool 200 may be that the same grinding tool 200 may be used throughout a continuous, multi-pass process to form both the chamfer portion 150 and the finishing portion 140 of a form tap 100 without requiring a tool change or adjustment.

Preferably, the multi-pass process includes four passes, comprising three rough-in passes and one finishing pass.

The multi-pass process may be advantageous because it may i) reduce the wear on the grinding tool, and ii) reduce the heat generated during the thread forming process thereby reducing the cooling and lubrication requirements of the manufacturing process.

Figure 7:
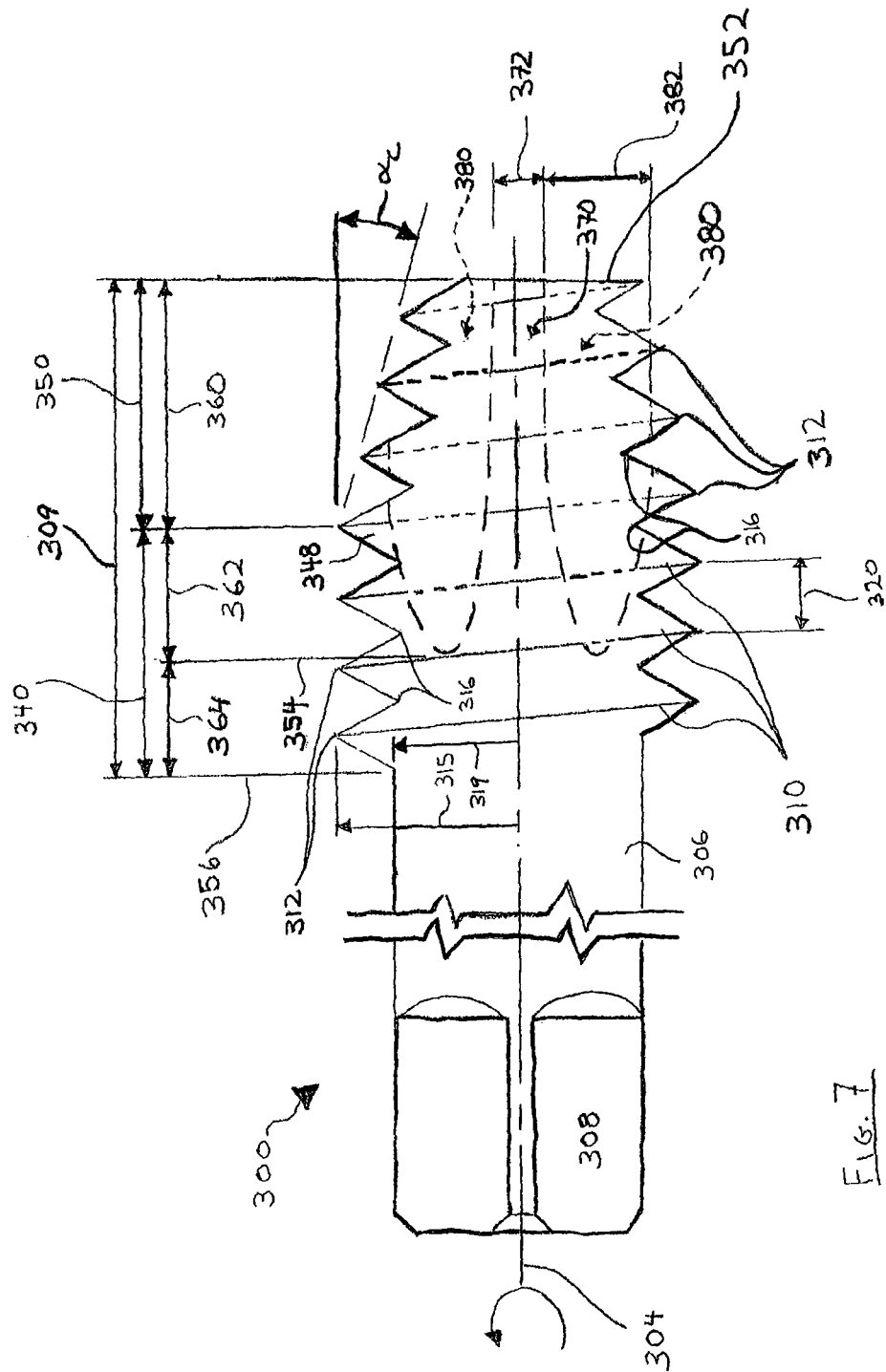
FIG. 7 is a side view of an example of a form tap having a plurality of lobes.
Figure 8:
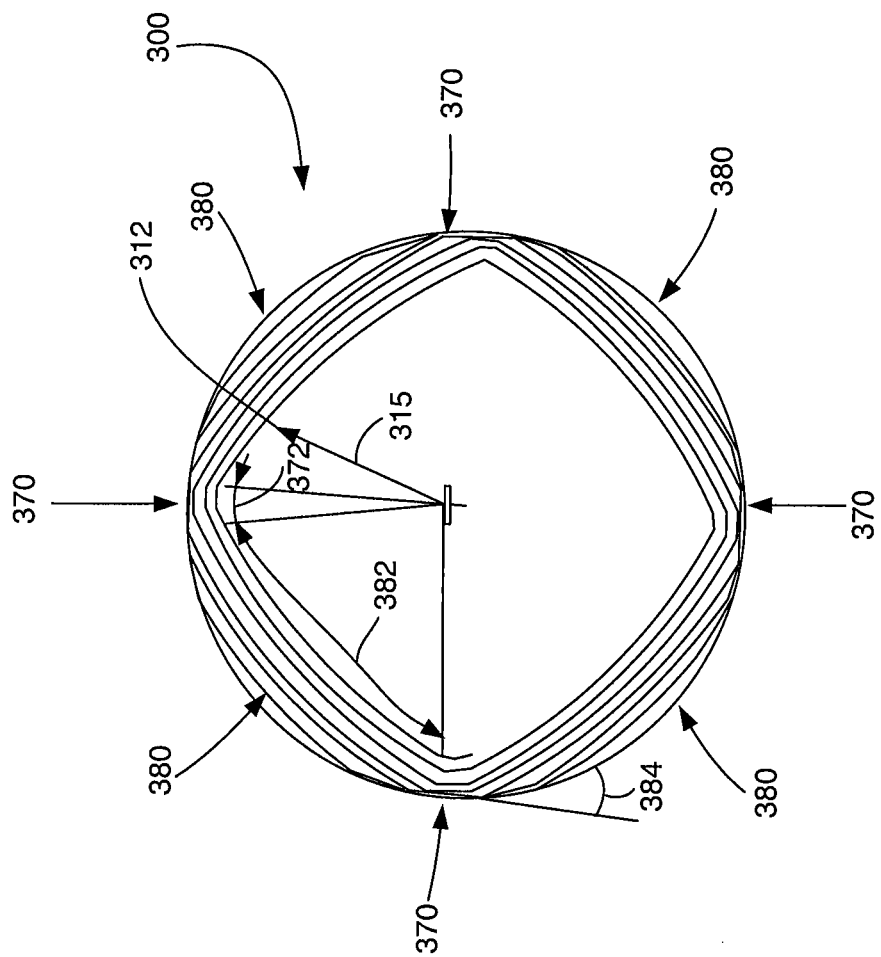
FIG. 8 is an end view of the form tap shown in FIG. 7.

Reference is made to FIGS. 7 and 8, which show another example of a form tap 300 having a shank 306 and a thread length or thread portion 309. The form tap 300 is generally similar to form tap 100 and similar features are given similar reference numerals increased by two hundred.

FIG. 7 is a side view of the form tap 300. In the illustrated example, the shank 306 has a mounting portion 308 and extends in an axial direction along an axis of rotation 304. The mounting portion 308 may be of any suitable shape or configuration so that the form tap 300 can be mounted into an apparatus during use. Examples of such apparatuses include machine chucks, sockets and handles.

The thread portion 309 extends along the axis of rotation 304 from a tip 352 to a thread end 356 and comprises a plurality of threads 310. The thread end 356 is defined as the location along the shank 306 at which the threads 310 end and the outer surface of the shank 306 has a different configuration, for example a generally smooth, cylindrical outer surface. The thread end 356 is intermediate the tip 352 and the mounting portion 308 and may be spaced apart from the mounting portion 308 to inhibit the threads 310 from being contacted by the apparatus holding the form tap 300 during use. The thread portion 309 defines a finishing portion 340 and a chamfer portion 350 that are separated by a transition thread 348.

Each thread 310 along the thread portion 309 has a crest 312 and a root 316. Each crest 312 defines a crest radius 315 that is measured from the axis of rotation 304 and each root 316 defines a root radius 319 as measured from the axis of rotation 304. Both the crest radius 315 and the root radius 319 generally increase from the tip 352 to the transition thread 348. The threads 310 may be shaped to include a crest flat or crest radius (as described above with reference to FIG. 2) and may be formed using the grinding tool 200, or other suitable tool. In some examples, the crest radius 315 and the root radius 319 can vary along the circumference of each thread 310 that includes a lobe 370 as described in greater detail below.

In the illustrated example, the threads 310 in the thread portion 309 are spaced apart at a constant thread pitch 320, like form tap 100 described above. Using the techniques and grinding tools described above (for example grinding tool 200), the crests 312 of the threads 310 in the thread portion 309 (from the finishing portion 340, across the transition thread 348 and along the chamfer portion 350) are all spaced apart by a constant pitch 320 so that the form tap 300 has no lead error. In other examples, the crest-to-crest pitch 320 may change across the transition thread 348 such that the form tap has a lead error.

In the illustrated example, referring to FIG. 7, the thread portion 309 includes a first region 360, a second region 362 and a third region 364. Each region extends longitudinally along the rotational axis 304. The first region 360 extends from the tip 352 to the transition thread 348. The first region 360 may extend for any length suitable for providing a lead in for the form tap 300 during use. For example, the first region 360 may extend for less than ten threads 310. In the illustrated example, the first region 360 extends for less than four threads 310. In other examples, the first region 360 may extend for longer than ten threads 310. The number of threads 310 in the first region 360 may be based on user preferences or requirements and/or the chamfer angle $\alpha_c$ and the pitch 320

The second region 362 extends from the transition thread 348 to a second region end 354. The second region end 354 is intermediate the transition thread 348 and the thread end 356. The second region end 354 is longitudinally spaced apart from the transition thread by one or more intervening threads 310. In some examples, the second region end 354 may be longitudinally spaced apart from the transition thread by one to ten threads 310 (i.e. between one and ten pitches 320). In the illustrated example, the second region end 354 is within two thread pitches 320 of the transition thread 348. In other examples, the second region may extend longer than ten threads 310.

In the illustrated example, the third region 364 extends between the second region end 354 and the thread end 356 and may include any suitable number of threads 310 desired by the user. For example, the third region may extend for less than ten threads 310. In the illustrated example, the third region extends for less than two threads 310. In other examples, the third region 364 may comprise ten or more threads 310.

The form tap 300 includes a plurality of lobes 370 extending through the first region 360 and the second region 362 (i.e. from the tip 352 to the second region end 354). Each lobe 370 extends circumferentially around at least a portion of the shank 306 and has a lobe width 372, measured in the circumferential direction. In the illustrated example, the lobe width 372 varies in the longitudinal direction, along the axis of rotation 304.

Referring to FIG. 8, the lobes 370 comprise the generally longitudinally aligned "high points", or portions of the crests 312 between first and second recessed relief portions 380, of each thread 310 in the first and second regions 360, 362. The lobes 370 lie on the respective crest circumference 374 of each thread 310 and are configured to contact the inner surface of a hole in an article being tapped (not shown). The relief portions 380 lie below (i.e. disposed radially inward from) the lobes 370 and may not contact or work the surface material of the article being tapped during normal use. The lobes 370 may comprise the portion of each thread 310 that works the material on the surface of the hole being tapped to shape the formed threads in the hole. As described in greater detail above in reference to form tap 100, the lobes 370 on the chamfer portion 350 partially form (or rough in) formed threads in the hole and the roughed in formed threads are finishing by the lobes 370 and full threads 310 in the finishing portion 340 (including the lobes 370 in the first second region 362 and the full threads or finishing threads in the third region 364).

In this specification, the crest circumference 374 of each thread 310 refers to the representation of the path or arc that would be swept by rotating the maximum crest radius 315 of each thread 310 about the axis of rotation 304. The crest circumference 374 of each thread 310 in the chamfer portion 350 increases from the tip 352 to the transition thread 348 as the crest radius 315 increases. The crest circumference 374 from the transition thread 348 to the thread end 356 remains constant. When viewed in cross-section (i.e. along the axis of rotation 304) the crest circumference 374 of each thread 310 can be approximated as a circle as illustrated. However, it is understood that the crest circumference 374 may not be a perfect circle within the chamfered portion 350 because the crest radius 315 of the threads 310 gradually increases along the circumference of the thread 310 at the chamfer angle $\alpha_c$.

Each lobe 370 is generally convex (i.e. follows the crest circumference 374) and is disposed circumferentially between first and second convex relief portions 380. The relief portions 380 are recessed from the crest circumference 374 to provide a clearance distance between the relief portions 380 and the surface being tapped. Each relief portion 380 is longitudinally coextensive with the lobes 370 and extends longitudinally from the tip 352 to the second region end 354. The relief portions 380 also extend circumferentially around at least a portion of the shank 306 and have a relief width 382, measured in the circumferential direction. The relief width 382 may vary along the axis of rotation 304.

In the illustrated, a portion of each thread 310 in the first and second region 360, 362 extends through both lobes 370 and relief portions 380 (as shown by the dashed portions of the diagonal lines extending between the opposing crests of a thread). Together the plurality of lobes 370 and corresponding relief portions 380 cooperate to encircle or surround the shank 306 in the first and second regions 360, 362.

The third region 364 includes a plurality of finishing threads 310. The finishing threads are generally similar to the threads 110 in the finishing section 140 described above. In some examples the finishing threads do not include lobes 370 or relief portions 380 and can be referred to as full threads or complete threads because the crests 312 of the threads 310 in the third region 364 have a constant crest radius 315. In such examples the third region is free from lobes 370.

Figure 9:
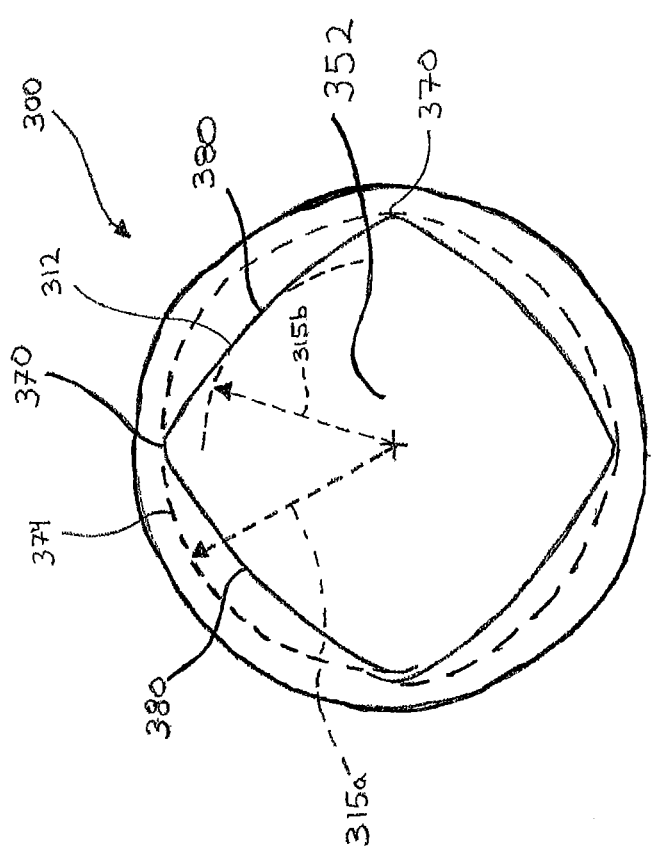
FIG. 9 is an end view of the form tap shown in FIG. 7 showing only the first thread on the chamfered portion.

Referring to FIG. 9, each relief portion 380 is spaced radially inward from the crest circumference 374. In other words, the crest radius 315 of each thread 310 in the first and second regions 360, 362 is smaller throughout the relief portion 380 than the crest radius 315 throughout the lobe 370. In the illustrated example, as shown in FIG. 9, the crest circumference 374 is defined by a maximum crest radius 315a for a given thread 310. The crests 312 of the portions of the threads 310 comprising the lobes 370 have a crest radius 315 equal to the maximum crest radius 315a and portions of the threads 310 comprising the relief portions 380 have a crest radius 315 that is less than the maximum crest radius 315a. In some examples, there may be a minimum crest radius 315b located on the relief portion 380 approximately midway between two circumferentially adjacent lobes 370. In such examples the crest radius 315 of each thread 310 may gradually increase from the minimum crest radius 315b along the relief portions 380 toward the maximum crest radius 315a along the lobes 370.

In some examples the relief portions 380 are formed by grinding the portions of the threads 310, between the desired lobe 370 locations, to remove material so that the relief portions 380 are recessed below the level of the lobes 370. The relief grinding process, as understood by a person skilled in the art, is a controlled process that is used to provide the desired convex curvature of the relief portions 380, between adjacent lobes 370. The convex shape or profile of the relief portions 380 can be varied based on user requirements and can be defined by a relief or clearance angle 384 that is measured between the surface of the relief portion 380 and a tangent of the lobe 370. When the relief portions 380 are formed using the relief grinding process, the portion of the threads 310 that lie within the relief portions 380 have crests and roots 312, 314 that are consistent with the crests and roots 312, 314 of the threads 310 in the lobes 370 and the threads 310 in the third region 364. The portions of the threads 310 in the relief portions 380 are not truncated, cut or otherwise damaged. In the illustrated example the convex curvature and overall profile shape of the relief portions 380 is ground to a specified configuration and is not equivalent to a simple longitudinal grind or cut through previously formed threads 310 in the first and second regions 360, 362.

In the illustrated example, as shown in FIGS. 8 and 9, the form tap 300 has four lobes 370 and four convex relief portions 380. In other examples, there may be a different number of lobes 370 and relief portions 380. For example, there may be two, three, five, eight or more lobes 370 and a corresponding number of concave relief portions 380 defined between adjacent lobes 370.

In the illustrated example, the lobes 370 and relief portions 380 are spaced equally around the circumference of each thread 310. In other examples, the lobes 370 and the relief portions 380 may be spaced unequally around the circumference. In some examples, the lobes and relief portions may extend along a path that is different than one parallel to the rotational axis 304. For example, the lobes 370 and relief portions 380 may extend along a helical path, or along a linear path inclined relative to the rotational axis 304.

Referring again to FIG. 7, the width of the lobes 370 and the relief portions 380 may change depending on the axial position along the first and second regions 360, 362. For example, the lobe width 372 at the second region end 354 is generally greater than the lobe width 372 at the tip 352. For example, the lobe width 372 at the second region end 354 may be between 1.5 and 10, or between 2 and 8 times greater than the lobe with 372 at the tip 352. In the illustrated example, the lobe width 372 at the second region end 354 is approximately 2 times greater than the lobe width 372 at the tip 352.

In the illustrated example, the lobe width 372 increases from the tip 352 to the second region end 354 at a varying rate (i.e. in a non-linear manner). The change in lobe width 372 in the first region 360 may be relatively small compared to the change in lobe width 372 in the second region 362. In other examples, the lobe width 372 may increase at a constant rate from the tip 352 to the second region end 356 or in any other suitable manner, such as parabolic, elliptical, exponential or any other geometric relationship.

In some examples, the lobe width 372 may remain generally constant for at least a portion of either the first or second region 360, 362, or both. For example, as illustrated in FIG. 7, the lobe width 372 may remain generally constant within the first region 360, from the tip 352 to the transition thread 348, and then increase from the transition thread 348 to the second region end 354. The lobe width 372 at the second region end 354 may be between 1.5 and 10, or between 2 and 8 times greater than the lobe with 372 at the transition thread 348. In the illustrated example, the lobe width 372 at the second region end 354 is approximately 2 to 3 times greater than the lobe width 372 at the transition thread 348.

The lobe width 372 and relief width 382 and the rate of change of both widths 372, 382 selected for a given form tap 300 may be based on a variety of factors, including, for example, the pitch 320, the chamfer angle ∝cc, the material being tapped (thickness, hardness, toughness, etc.) and the expected tapping operation (deep hole tapping, in-die tapping, etc.). When the width 372 of the lobes 370 changes the relief width 382 may also change in a complimentary manner, based on the axial position of the measurement along the first and second regions 360, 362. For example, as the lobe width 372 increases the relief width 382 may decrease proportionally.

In some examples, the relief width 382 at the tip 352 is larger than the lobe width 372 at the tip 352. For example, the relief width 382 may be between 1.5 and 6 times larger than the lobe width 372 at the tip 352. In the illustrated example, the relief width 382 is between 2-25 times larger than the lobe width 372 at the tip 352. In other examples, the relief width 382 at the tip 352 may be approximately equal to or smaller than the lobe width 372 at the tip 352.

When using the form tap 300 to form threads on a work piece, the lobes 370 are the portions of the threads 310 that do the majority of the forming work in the first and second regions 360, 362 because they lie on the outer, crest circumference 374. The relatively small lobe widths 372 (compared to the full threads 310 of constant crest radius 315 in the finishing portion 340) of the lobes 370 in the chamfer portion 350 enables the lobes 370 to rough in formed threads in the surface being tapped while requiring relatively less torque and generating relatively less heat than would be required to work a full thread 310. In some examples, torque requirements and heat generation may be lower in the first and second regions 360, 362 portions because the relief portions 380 are recessed from the lobes 370 and do not contact the surface being worked.

As the form tap 300 is advanced into the article being tapped, the lobes 370 in the chamfer portion 350 incrementally rough in the formed threads, as described in greater detail above with reference to form tap 100. The finished profile of the formed threads is then formed by the lobes 370 in the second region 362 that have the same crest radius 315 and profile as the full threads 310 in the third region 364 and by the threads 310 in the third portion 364. In some examples the load experienced by the transition thread 348 and the first few threads 130 in the finishing portion 340 is relatively higher than the load experienced by the threads 310 in the chamfer portion 350 and the remaining threads 310 in the finishing portion 340. In such examples, the increased load on the first few threads 310, including the transition thread 348, on the finishing portion 340 can lead to increased wear and thread failure. Increasing the lobe width 372 in the second region 362 may provide a larger contact/working surface between the lobe 370 and the material being formed which may reduce wear and failure of the lobes 370 and prolong the useful life of the form tap 300.

In some examples, as the lobes 370 wear down over multiple uses, the crest radius 315 of the lobes 370 may decrease and marginal sections of the relief portions 380 may merge with the lobes 370. As the crest radius 315 of the threads 310 wear down, the lobe width 372 may increase and the relief width 382 may decrease proportionally. The sections of the relief portions 380 that merge with the lobes 370 may form threads on the work piece. In some examples the relief portions 380 of form tap 300 may have threads that have the same or substantially similar crests 312 and roots 316. In some instances this may extend the useful thread forming ability of the form tap 300.

Figure 10:
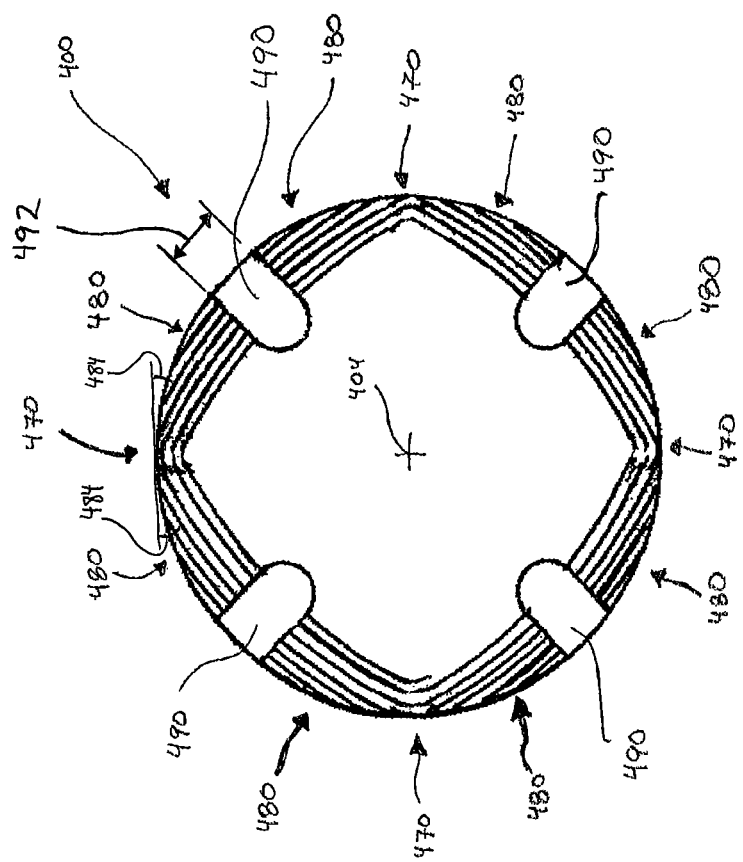
FIG. 10 is an end view of another example of form tap having a plurality of lobes.
Figure 11:
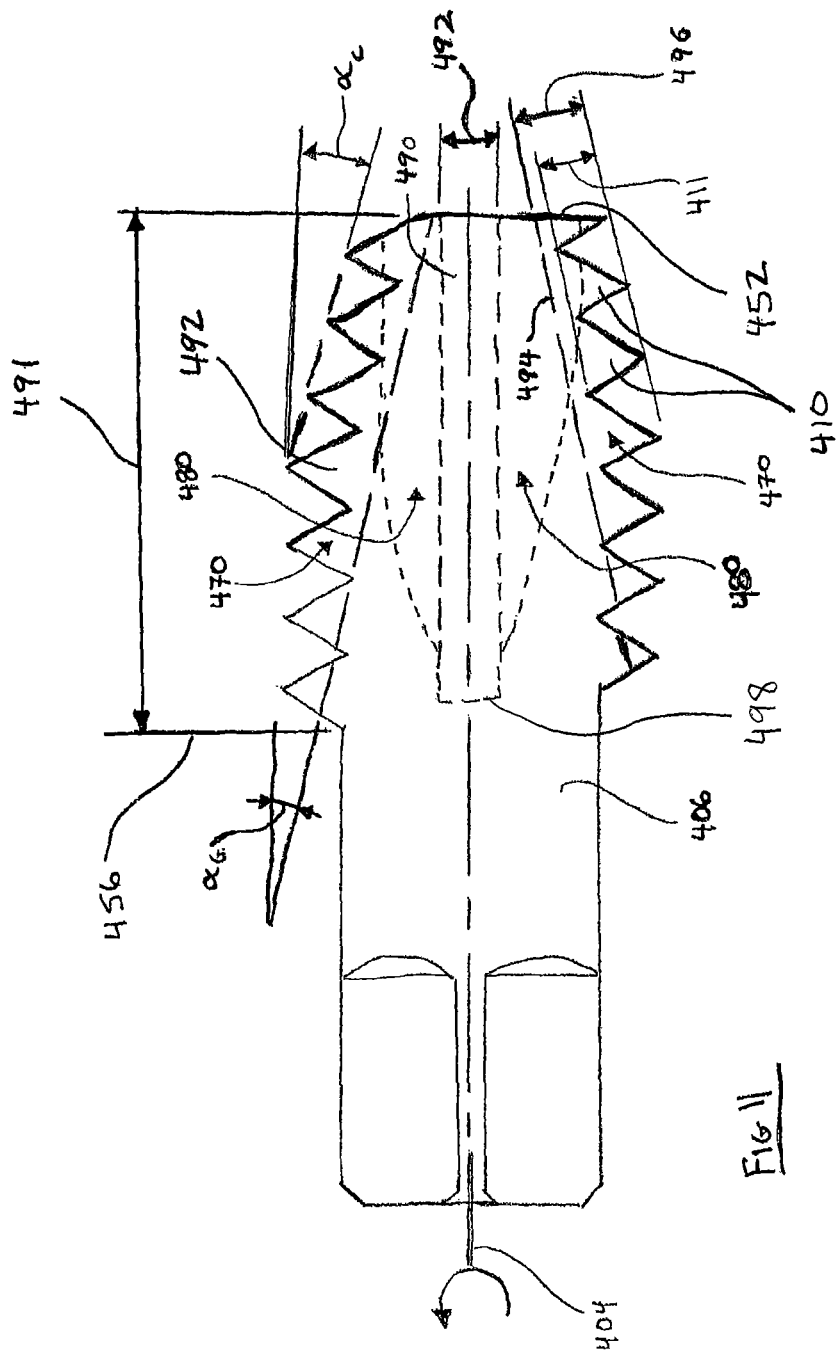
FIG. 11 is a section view of the form tap of FIG. 10.

Referring to FIGS. 10 and 11, another example of form tap 400 is illustrated. The form tap 400 is generally similar to form tap 300 and similar features are given similar reference numerals increased by one hundred. The form tap 400 comprises lubrication grooves 490 disposed in the relief portions 480. In the illustrated example, the form tap 400 includes four lubrication grooves 490.

Each lubrication groove 490 has a groove length 491 and each lubrication groove extends longitudinally from a tip 456 of the form tap 400 to groove end 498. In some examples the groove end 498 is the thread end 456. In other examples, the groove end 498 can be the transition thread 492 or another location intermediate the tip 452 and the second region end.

As shown in FIG. 10, each lubrication groove 490 is formed in a respective relief portion 480, between adjacent lobes 470. The lubrication grooves 490 may be formed using any suitable method, including grinding or using a cutting wheel. In some examples, forming the lubrication grooves 490 may destroy a portion of the threads 310 in the relief portions 480.

The lubrication grooves 490 may be disposed in the approximate centre of the relief portions 480 as illustrated or, in other examples, the lubrication grooves 490 may be off-centre (i.e. closer to a first lobe 470 than a second lobe 470). In some examples a lubrication groove 490 may only be disposed in some of the relief portions 480 and/or more than one lubrication groove 490 may be provided in each relief portion 480.

In the illustrated example, there are four lobes 470, four lubrication grooves 490, and four relief portions 490 (separated into eight sections by the lubrication grooves 490). Each pair of relief portion sections that are separated by a respective lubrication groove 490 generally cooperate to define a relief portion profile that is similar to the profile of the uninterrupted relief portions 380 described above. In other examples, each relief portion may have a different curvature or profile and may be considered a distinct relief portion.

Like relief portions 380 described above, the relief portions 480 may be formed using a relief grinding process so that the portions of the threads 410 in the relief portions are formed to include respective crests and roots and so that the relief portions 480 have convex surfaces formed at a suitable relief angle 484.

The lubrication grooves 490 may enable lubricant to flow longitudinally along the axis of rotation 404 between adjacent sections of the relief portions 480. In the illustrated example, each lubrication groove 490 has a constant groove width 492 and is parallel to the rotational axis 404 (i.e. the longitudinal axis) of the shank 406. In other examples, the lubrication groove 490 may have other configurations. For example, the lubrication groove 490 may have a groove width 492 that varies along the longitudinal axis 404 and/or the lubrication grooves 490 may extend along other paths. For example, a longitudinal groove 490 may have a helical path.

The lubrication groove 490 may be inclined at a groove angle $\alpha_G$ relative to the longitudinal axis 404. In the illustrated example the lubrication groove is inclined such that the radial position of a bottom surface 494 of the lubrication groove 490 increases from the tip 452 toward the groove end 498. As shown, the groove angle $\alpha_G$ may be approximately the same as the chamfer angle $\alpha_c$. In other examples, the lubrication groove 490 the groove angle $\alpha_G$ may be different than the chamfer angle $\alpha_c$. In some examples, the groove angle $\alpha_G$ may be zero degrees such that there is no inclination relative to the longitudinal axis 404.

Each lobe 470 may comprise a plurality of threads 410 that have a respective crests 412 and respective roots 416 separated by a thread height 411. Along the chamfer portion 450, the thread height 411 may be defined along the chamfer angle $\alpha_c$ between the crest 412 and the root 416. Each lubrication groove 490 has a groove depth 496 defined between the bottom surface 494 of the lubrication groove 490 and the crests 412 of the threads 410 crossed by the lubrication groove 490. In some examples the depth 496 of the lubrication grooves 490 may be generally greater than the height 411 of threads 410, such that that the bottom surface 494 of each lubrication groove 490 is disposed radially inward of the respective roots 416 of each respective thread 410 crossed by the lubrication groove 490. In other examples, the lubrication grooves 490 may have different configurations. For example, the groove depth 496 may be less than or equal to the thread height 411.

Introducing lubrication to the form tap 400 when in use, for example via the lubrication grooves 490, may help to reduce the friction and heat generated while forming threads on a work piece. In some examples, lubrication grooves 490 may be unnecessary because the heat generation from the tap is insignificant to justify providing lubrication while forming threads on a work piece. For example, lubrication grooves 490 may be unnecessary when forming threads work pieces that are thin. In other examples, the lubrication grooves 490 may be useful to dissipate heat on thicker work pieces.

In some examples the form tap 400 may be used as a spatter tap to remove weldment spatter from a threaded article that was welded after being tapped. In such examples the lobes 470 may scrap weldment debris from the threaded article and the lubrication grooves 490 may also be shaped and sized to convey the weldment particles out of the threaded article.

In some examples the form tap 300, 400 may be used for in-die tapping operations in which the form tap 300, 400 is used to tap relatively thin material (e.g. sheet metal) while the material is held in a forming die.

The present invention has been described here by way of example only. Various modification and variations may be made to these exemplary examples without departing from the spirit and scope of the invention, which is limited only by the appended claims.

I claim:

1. A form tap for tapping an article, the form tap comprising:
    a longitudinal shank having a mounting end opposite a tip, the shank having a shank length;
    a thread portion comprising a plurality of threads for engaging a surface of the article, the thread portion extending longitudinally along the shank from the tip to a thread end, the thread portion comprising a finishing section and a chamfer portion extending between the tip and a transition thread, the thread portion comprising;
    a first region extending from the tip to the transition thread,
    a second region extending from the transition thread to a second region end intermediate the transition thread and the thread end, and
    a third region extending from the second region end to the thread end;
    a plurality of lobes extending through the first and second regions from the tip to the second region end, the lobes being spaced circumferentially around the shank and lying on a crest circumference, each lobe being disposed between respective first and second convex relief portions, each relief portion being spaced radially inward from the crest circumference, each lobe having a lobe width, the lobe width at the second region end being greater than the lobe width at the tip; and
    a plurality of longitudinal lubrication grooves, each lubrication groove being disposed in a respective one of the relief portions and extending from the tip, through the entire first and second regions and extending through at least a portion of the third region;

the third region comprising a plurality of finishing threads and being free of lobes.

2. The form tap of claim 1, wherein the lobe width at the second region end is between 2 and 8 times greater than the lobe width at the tip.

3. The form tap of claim 1, wherein the lobe width remains generally constant from the tip to the transition thread.

4. The form tap of claim 3, wherein the lobe width at the second region end is between 2 and 8 times greater than the lobe width at the transition thread.

5. The form tap of claim 1, wherein each thread in the first and second region comprises a crest radius, the crest radius of each thread being greater at the lobes than at the relief portion.

6. The form tap of claim 1, wherein each relief portion defines a relief width, the relief width at the second region end being less than the relief width at the tip.

7. The form tap of claim 6, wherein the relief width at the tip is between 2 and 25 times larger than the lobe width at the tip.

8. The form tap of claim 6, wherein the relief width at the tip is at least 2 times larger than the lobe width at the tip.

9. The form tap of claim 1, wherein adjacent ones of the threads in the thread portion are separated by a pitch and the second region end is within 10 pitches of the transition thread.

10. The form tap of claim 1, wherein each lubrication groove comprises a generally planar bottom wall and the bottom wall is inclined at groove angle relative to the longitudinal axis.

11. The form tap of claim 10, wherein the groove angle is the same as a chamfer angle.

12. The form tap of claim 1, wherein each thread of the plurality of threads has a crest and a root separated by a thread height and each groove has a groove depth, the groove depth being greater than the thread height so that a bottom surface of each groove is disposed radially inward of the thread roots.

13. The form tap of claim 1, wherein each thread of the plurality of threads comprises a crest and a root, the plurality of threads being spaced apart by a constant pitch such that a crest-to-crest distance between adjacent threads remains constant along the entire thread portion.

14. A thread cleaning tool for removing debris from formed threads in an article, the thread cleaning tool comprising:
 a) a shank extending along a longitudinal axis and having a mounting end opposite a tip;
 b) a threaded portion comprising a plurality of threads for engaging the formed threads in the article, the threaded portion extending axially along the shank from the tip to a thread end, the threaded portion comprising a chamfer portion extending between the tip and a transition thread and a finishing section extending between the transition thread and the thread end, the threaded portion comprising;
   i) a first region extending from the tip to the transition thread,
   ii) a second region extending from the transition thread to a second region end intermediate the transition thread and the thread end, and
   iii) a third region extending from the second region end to the thread end;
 c) a plurality of lobes and convex relief portions extending axially along the thread portion, the plurality of lobes extending through at least the first region and the plurality of relief portions extending from the tip to the second region end, the lobes being spaced apart from each other around the shank and lying on a crest circumference, each lobe being disposed between respective ones of the convex relief portions, each relief portion being spaced radially inward from the crest circumference, each lobe having a lobe width, the lobe width at the transition thread being greater than the lobe width at the tip, the third region comprising a plurality of finishing threads and being free of lobes and relief portions; and
 d) at least one debris removal groove disposed in one of the plurality of relief portions, the at least one debris removal groove extending axially from the tip, through the entire first and second regions and extending through at least a portion of the third region.

15. The thread cleaning tool of claim 14, wherein each debris removal groove comprises a generally planar bottom wall and the bottom wall is inclined at groove angle relative to the longitudinal axis.

16. The thread cleaning tool of claim 14, wherein the lobe width at the transition thread is between 2 and 8 times greater than the lobe width at the tip.

17. The thread cleaning tool of claim 14, wherein each relief portion defines a relief width, the relief width at the second region end being less than the relief width at the tip.

18. The thread cleaning tool of claim 14, wherein adjacent ones of the threads in the thread portion are separated by a pitch and the second region end is within 10 pitches of the transition thread.

19. The thread cleaning tool of claim 14, wherein each thread of the plurality of threads comprises a crest and a root, the plurality of threads being spaced apart by a constant pitch such that a crest-to-crest distance between adjacent threads remains constant along the entire thread portion.

20. The thread cleaning tool of claim 14, wherein the at least one debris removal groove comprises one debris removal groove disposed in each one of the plurality of relief portions.

* * * * *